C. J. REIGH.
MOTOR VEHICLE.
APPLICATION FILED APR. 16, 1920.
1,428,907.
Patented Sept. 12, 1922.
2 SHEETS—SHEET 1.
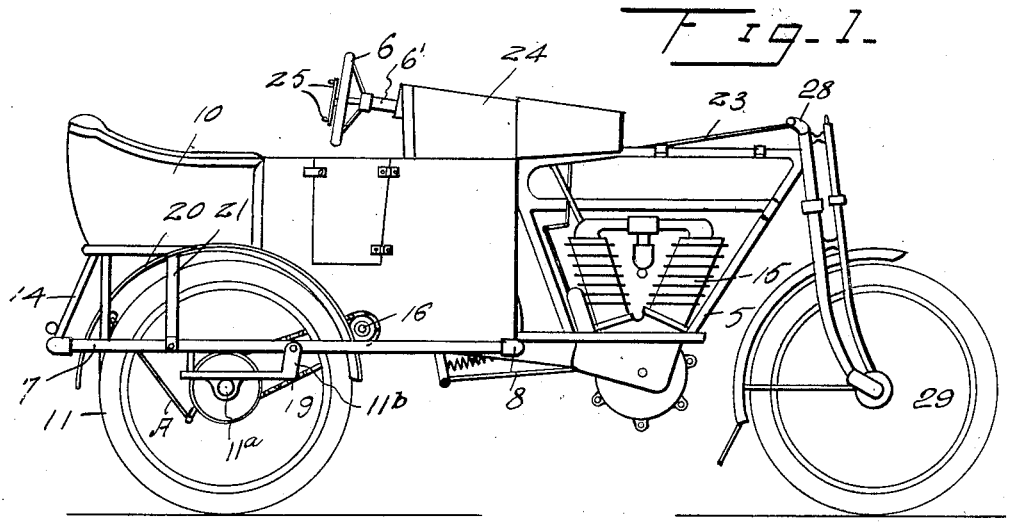
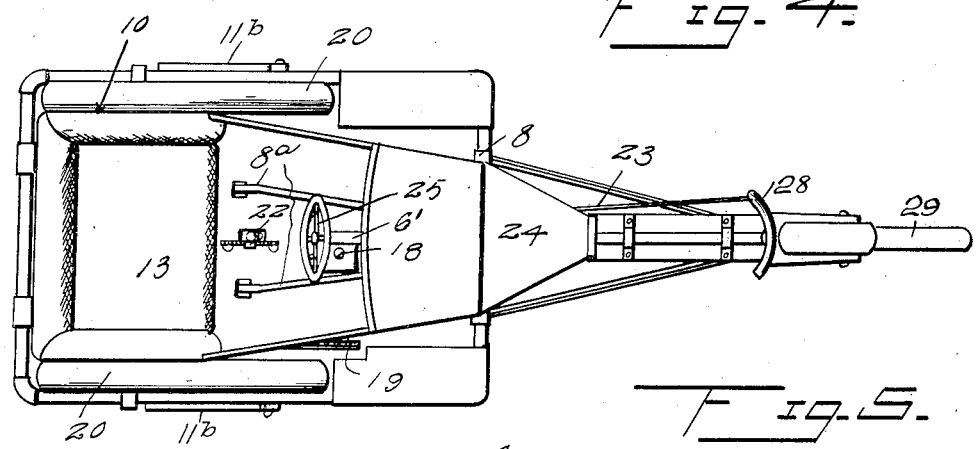
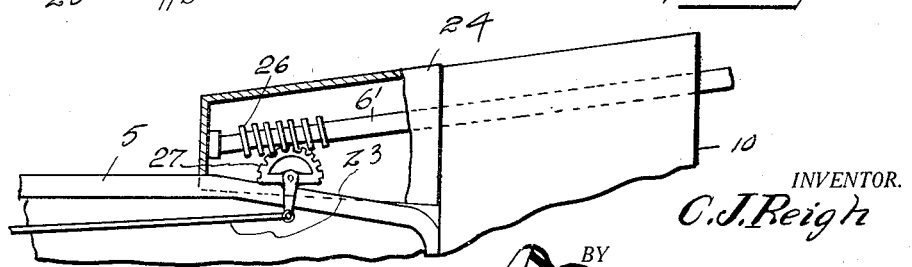
INVENTOR.
C. J. Reigh
BY
ATTORNEY.

C. J. REIGH.
MOTOR VEHICLE.
APPLICATION FILED APR. 16, 1920.
1,428,907.
Patented Sept. 12, 1922.
2 SHEETS—SHEET 2.
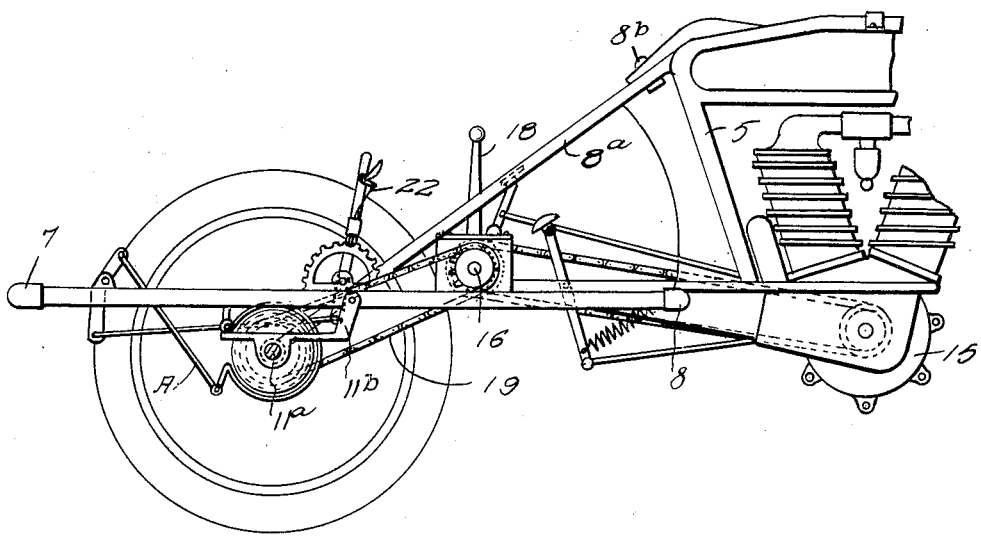
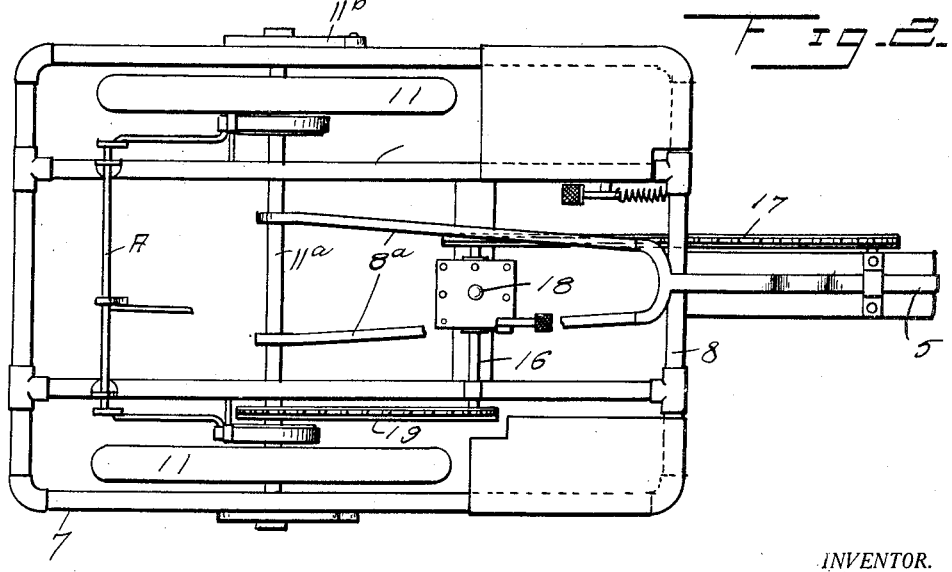
INVENTOR.
C. J. Reigh
ATTORNEY.

Patented Sept. 12, 1922.

1,428,907

UNITED STATES PATENT OFFICE.

CLARENCE J. REIGH, OF JUNIATA, PENNSYLVANIA.

MOTOR VEHICLE.

Application filed April 16, 1920. Serial No. 374,460

*To all whom it may concern:*

Be it known that I, CLARENCE J. REIGH, a citizen of the United States, residing at Juniata, in the county of Blair and State of Pennsylvania, have invented certain new and useful Improvements in Motor Vehicles; and I do hereby declare the following to be a full, clear, and exact description of the invention, such as will enable others skilled in the art to which it appertains to make and use the same.

My invention relates to motor vehicles, its principal object being to combine a conventional motorcycle car and carrier in tandem formation and in such a manner as to render the vehicle comfortable to the occupants as well as to facilitate the operation of the same.

A further object of the invention is to provide a motor vehicle which may be steered from the carrier and which will enable the driver to sit in upright position, the construction being such as to reduce the danger of turning over when turning sharp curves which is ordinarily experienced in motorcycles having side car attachments.

Another object of the invention is to provide a motor vehicle of this type which is simple in construction, has few and durable parts, and which may be manufactured at minimum expense.

With the above and other objects and advantages in mind, the invention consists in the novel combination of elements, construction and arrangement, operation and specific features all of which will be hereinafter enlarged upon and recited in the subjoined claims, the invention being illustrated in the accompanying drawings, in which:

Figure 1 is a side elevation of a motor vehicle constructed in accordance with my invention;

Figure 2 is a top plan view of the vehicle with the carrier or car removed;

Figure 3 is a fragmentary view, parts being broken away to illustrate the operating mechanism;

Figure 4 is a plan view of the assembled vehicle, and

Figure 5 is an enlarged detail view illustrating the steering gear.

Referring to the drawing wherein like characters of references designate like parts throughout the several views the numeral 5 designates the frame of a conventional motorcycle provided with the usual steering wheel 6.

Disposed rearwardly of the frames 5 is a horizontal rectangular frame 7. Frames 5 and 7 are connected together at the forward arms 8 of the frame 7.

The car or carrier body is designated at 10 and is supported upon the drive wheels 11 disposed within the frame 7 and includes an elevated seat 13 which is supported by a supporting leg 14 mounted upon the frame 7 and out of interfering relation with brake mechanism A. The driving axle for wheel 11 is designated $11^a$ and is journaled in hangers $11^b$ depending from the side of frame 7. Diagonal arms $8^a$ are fastened at a distance above arm 8 to frame 5 as at $8^b$. Said arms $8^a$ directly journal axle $11^a$ and effectively brace or rigidify frame 7.

The engine is designated at 15 and is mounted upon the frame 5 in any conventional manner and imparts motion to a shaft through the medium of a sprocket chain 17, the shaft being provided with the usual gear shift lever 18. Motion is imparted to the drive wheels by a sprocket chain 19 in operative engagement with the shaft 16.

Mud guards 20 are disposed upon opposite sides of the carrier and are supported by vertically disposed supporting bars 21 mounted upon the frame 7. The usual brake lever is designated at 22. The usual spark and gas control are designated at 25 and are controlled from the steering wheel. Steering wheel 6 is operable to turn a post 6′. Said post through the medium of a worm 26, rocks a segment 27 which shifts a link 23 pivoted to a crank or handle bar 28 which directly turns the usual swiveled front wheel 29. A hood 24 encloses the operative gears and associated parts of the steering mechanism.

The construction illustrated and described is a practical embodiment of my invention but it be understood that the same may be modified in many respects and that my limits of such modification are only governed by what is claimed.

What is claimed is:

In combination with a motor cycle frame, a supplemental frame on which said motorcycle frame rests extending rearwardly therefrom, rear wheels, an axle for said wheels on said supplemental frame, a brace means extending below said frames and journaling the axle below said frames, said brace means being connected to the motorcycle frame at a distance above the supplemental frame, means on the supplemental frame driven by the rear wheel drive of the motor cycle, means to drive said axle from said means, a carrier body on the supplemental frame, and said brace means extending through the floor of said carrier body.

In testimony whereof I affix my signature in presence of two witnesses.

CLARENCE J. REIGH.

Witnesses:
ROBERT C. ZONG,
FREDERICK H. DICKSON.